(12) United States Patent
Bladel (10) Patent No.: US 9,275,040 B1
(45) Date of Patent: Mar. 1, 2016

(54) VALIDATING USER CONTROL OVER CONTACT INFORMATION IN A DOMAIN NAME REGISTRATION DATABASE

(75) Inventor: James Bladel, Le Claire, IA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 133 days.

(21) Appl. No.: 13/616,570

(22) Filed: Sep. 14, 2012

(51) Int. Cl.
*G06F 17/00* (2006.01)
*G06F 17/27* (2006.01)

(52) U.S. Cl.
CPC .................................. *G06F 17/278* (2013.01)

(58) Field of Classification Search
CPC ..................... G06F 17/30386; G06F 17/30283; G06F 17/30; G06F 17/30943; G06F 21/00; G06F 17/00; G06F 17/30011; G06F 17/301; G06F 17/30277; G06F 17/3061; G06F 17/30684; G06F 15/173; G06F 17/273
USPC .......................................................... 707/758
See application file for complete search history.

(56) References Cited

U.S. PATENT DOCUMENTS

| | | |
|---|---|---|
| 6,334,132 B1 | 12/2001 | Weeks |
| 6,418,441 B1 | 7/2002 | Call |
| 6,876,997 B1 | 4/2005 | Rorex et al. |
| 6,880,007 B1 | 4/2005 | Gardos et al. |
| 6,895,431 B1 | 5/2005 | Bero |
| 7,467,140 B2 | 12/2008 | Monroe |
| 7,472,160 B2 | 12/2008 | King et al. |
| 7,565,630 B1 | 7/2009 | Kamvar et al. |
| 7,689,458 B2 | 3/2010 | Heckerman et al. |
| 7,788,130 B2 | 8/2010 | Feeley et al. |
| 7,805,379 B1 | 9/2010 | Adkins, III et al. |
| 8,117,339 B2 | 2/2012 | Adelman et al. |
| 2002/0010795 A1 | 1/2002 | Brown |
| 2002/0026439 A1 | 2/2002 | Monroe |
| 2002/0091827 A1 | 7/2002 | King et al. |
| 2002/0178383 A1 | 11/2002 | Hrabik et al. |
| 2004/0064561 A1 | 4/2004 | Parsons et al. |
| 2004/0083306 A1 | 4/2004 | Gloe |
| 2005/0039017 A1 | 2/2005 | Delany |
| 2005/0039019 A1 | 2/2005 | Delany |
| 2005/0055299 A1 | 3/2005 | Chambers et al. |

(Continued)

OTHER PUBLICATIONS

Internet print-out of http://web.archive.org/web/20000901042248/ http://www.datex.net/ecommerce/glossary.htm, Internet archive of datex.net, Sep. 1, 2000.

(Continued)

*Primary Examiner* — Truong Vo
(74) *Attorney, Agent, or Firm* — Quarles & Brady LLP (57) ABSTRACT

An example embodiment of a method and system of validating a user's control over contact information may comprise at least one server computer receiving contact information for a user and determining whether the contact information for the user is valid. If the contact information for the user is determined to be valid, the server computer(s) may store the contact information in a registered contacts database, monitor a plurality of record updates, including a request to register a domain name, in a domain name registration database for the contact information and determine whether the contact information appears in the record updates. If the contact information is determined to appear in the record updates, the server computer(s) may notify the user that the contact information appears in the record updates. In some embodiments, the registration of the domain name may be declined if the information matches.

12 Claims, 4 Drawing Sheets

(56) References Cited

U.S. PATENT DOCUMENTS

| | | |
|---|---|---|
| 2005/0273344 A1 | 12/2005 | Lee et al. |
| 2006/0011720 A1 | 1/2006 | Call |
| 2006/0031315 A1 | 2/2006 | Fenton et al. |
| 2006/0101113 A1 | 5/2006 | Lemson et al. |
| 2006/0101155 A1 | 5/2006 | Damour et al. |
| 2006/0195609 A1 | 8/2006 | Han |
| 2007/0067465 A1 | 3/2007 | Blinn et al. |
| 2007/0094411 A1 | 4/2007 | Mullane et al. |
| 2007/0266141 A1 | 11/2007 | Norton |
| 2007/0299682 A1 | 12/2007 | Roth et al. |
| 2008/0005312 A1 | 1/2008 | Boss et al. |
| 2008/0005342 A1 | 1/2008 | Schneider |
| 2008/0022013 A1* | 1/2008 | Adelman et al. ............... 709/245 |
| 2008/0027809 A1 | 1/2008 | Storm |
| 2008/0034211 A1 | 2/2008 | Shull |
| 2008/0065974 A1 | 3/2008 | Campbell |
| 2008/0201487 A1 | 8/2008 | Blinn et al. |
| 2008/0313229 A1 | 12/2008 | Taswell |
| 2009/0171678 A1 | 7/2009 | Zimmerman et al. |
| 2009/0171823 A1 | 7/2009 | Zimmerman et al. |
| 2009/0216577 A1 | 8/2009 | Killebrew |
| 2009/0254572 A1 | 10/2009 | Redlich et al. |
| 2009/0265415 A1 | 10/2009 | Harry |
| 2012/0047577 A1 | 2/2012 | Costinsky |

OTHER PUBLICATIONS

GHG Internet Services, "Domain Name Registration Information", pp. 1 and 2.
RFC 1464, Using the Domain Name System to Store Arbitrary String Attributes, May 1, 1993.
Final task force report on the purpose of Whois and of the Whois contacts, Mar. 15, 2006.
Network Solutions Launches Enhanced Business Listings, Nov. 26, 2007.
Fusu introduces Domain Stock Exchange in private beta, http://www.domainnamenews.com/domain-sales/fusuintroduces-domain-stock-exchange-in-private-beta/885.
Dnxpert, Fusu Domain Stock Exchange in Beta, http://www.dnxpert.com/2007/10/18/fusu-domain-stock-exchange-in-beta/.
Ramaswamy, An Integrity Verification Scheme for DNS Zone file based on Security Impact Analysis.
Brain, Marshall. How Domain Name Servers Work [Online]. Retrieved from: http://web.archive.org/web/20020223193850/www.howstuffworks.com/dns.htm/printable. Feb. 23, 2002.
Ramaswamy Chandramouli and Scott Rose "Challenges in Securing the Domain Name System", IEEE Security & Privacy, 2006, pp. 84-87.

* cited by examiner

VALIDATING USER CONTROL OVER CONTACT INFORMATION IN A DOMAIN NAME REGISTRATION DATABASE

FIELD OF THE INVENTION

The present inventions generally relate to domain names and, more particularly, methods and systems for validating a user's control over contact information stored in a domain name registration database.

SUMMARY OF THE INVENTION

An example embodiment of a method of validating a user's control over contact information may comprise at least one server computer receiving contact information for a user and determining whether the contact information for the user is valid. If the contact information for the user is determined to be valid, the server computer(s) may store the contact information in a registered contacts database, monitor a plurality of record updates in a domain name registration database for the contact information and determine whether the contact information appears in the record updates. If the contact information is determined to appear in the record updates, the server computer(s) may notify the user that the contact information appears in the record updates. The server computer(s), registered contacts database and domain name registration database may all be communicatively coupled to a network.

Another example embodiment of a method of validating a user's control over contact information may comprise the at least one server computer receiving a request to register a domain name to a prospective registrant and determining whether a prospective registrant contact information, included with the request, matches a contact information for a user stored in a registered contacts database and determined to be valid. If the prospective registrant contact information is determined to match the contact information for the user stored in the registered contacts database, the server computer(s) may notify the user that the prospective registrant contact information matches the contact information for the user stored in the registered contacts database or decline to register the domain name to the prospective registrant.

An example embodiment of a system for validating a user's control over contact information may comprise one or more server computers, a registered contacts database running on the server(s) and a domain name registration database, all communicatively coupled to a network. The server computer may be configured to receive contact information for a user and determine whether the contact information for the user is valid. If the contact information for the user is determined to be valid, the server computer may store the contact information in the registered contacts database, monitor a plurality of record updates in the domain name registration database for the contact information and determine whether the contact information appears in the record updates. If the contact information is determined to appear in the record updates, the user may be notified that the contact information appears in the record updates.

Another example embodiment of a system for validating a user's control over contact information may comprise the server computer and/or one or more additional server computers communicatively coupled to a network and running the registered contacts database. The registered contacts database may store contact information, determined to be valid, for each of a plurality of users. The server(s) may be further configured to receive a request to register a domain name to a prospective registrant and determine whether prospective registrant contact information, included with the request, matches contact information for a user stored in a registered contacts database and determined to be valid. If the prospective registrant contact information is determined to match the contact information for the user stored in the registered contacts database, the server(s) may be configured to notify the user that the prospective registrant contact information matches the contact information for the user stored in the registered contacts database or to decline to register the domain name to the prospective registrant.

The above features and advantages of the present inventions will be better understood from the following detailed description taken in conjunction with the accompanying drawings.

DETAILED DESCRIPTION

The present inventions will now be discussed in detail with regard to the attached drawing figures, which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related webpages. Menus and links may be used to move between different webpages within the website or to move to a different website as is known in the art. The interconnectivity of webpages enabled by the Internet can make it difficult for Internet users to tell where one website ends and another begins. Websites may be created using HyperText Markup Language (HTML) to generate a standard set of tags that define how the webpages for the website are to be displayed. Such websites may comprise a collection of HTML and subordinate documents (i.e., files) stored on the Web that are typically accessible from the same Uniform Resource Locator (URL) and reside on the same server, although such files may be distributed in numerous servers.

Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A URL is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain. An example of a URL with a HTTP request and domain is: http://www.companyname.com. In this example, the "http" identifies the URL as a HTTP request and the "companyname.com" is the domain.

Websites, unless extremely large and complex or have unusual traffic demands, typically reside on a single server and are prepared and maintained by a single individual or entity. Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

The domain name system (DNS) is the world's largest distributed computing system that enables access to any resource in the Internet by translating user-friendly domain names to IP Addresses. The process of translating domain names to IP Addresses is called Name Resolution. A DNS name resolution is the first step in the majority of Internet transactions. The DNS is in fact a client-server system that provides this name resolution service through a family of servers called Domain Name Servers. The hierarchical domain space is divided into administrative units called zones. A zone usually consists of a domain (e.g. example-.com) and possibly one or more sub domains (e.g. projects.example.com, services.example.com). The authoritative data needed for performing the name resolution service is contained in a file called the zone file and the DNS servers hosting this file are called the authoritative name servers for that zone.

The DNS infrastructure consists of many different types of DNS servers, DNS clients, and transactions between these entities. The most important transaction in DNS is the one that provides the core service of DNS (i.e., name resolution service) and is called the DNS Query/Response. A DNS Query/Response transaction is made up of a query originating from a DNS client (generically called a DNS resolver) and response from a DNS name server. In this way, the DNS serves as a global, distributed database. Name servers (serving zone files) each contain a small portion of the global domain space, and clients issue queries using a domain name.

WHOIS is a TCP (Transmission Control Protocol) based transaction-oriented query/response protocol that is used to provide information services to Internet users. While originally used to provide "white pages" services and information about registered domain names, current deployments cover a much broader range of information services. The protocol delivers its content in a human-readable format.

A WHOIS server listens for requests from WHOIS clients. The WHOIS client makes a text request to the WHOIS server, then the WHOIS server replies with text content. The WHOIS server closes its connection as soon as the output is finished. The closed TCP connection is the indication to the client that the response has been received.

WHOIS information may be stored and/or transmitted in the form of a contact object. For example, contact information for a registrant of a domain name may be stored in a registrant contact object. The registrant contact object may be used to determine legal responsibility for domain name registrations. A contact object may comprise an XML document which stores contact information in a series of fields/parameters identified by XML tags. Non-limiting examples of such fields/parameters/tags may include: contact:id—used to identify a "handle" for the user/registrant; contact:name—used to identify the user/registrant; contact:voice—used to identify a phone number for contacting the user/registrant; contact:fax—used to identify a fax number for contacting the user/registrant; contact:email—used to identify an email address for contacting the user/registrant; contact:postalInfo—a series of fields/parameters/tags nested within the contact:postal Info (and/or possibly contact:addr) fields/parameters/tags including contact:street, contact:city, contact:pc (postal code) and contact:cc (country code) used to identify a physical address for the user/registrant; contact:org—used to identify a legal business entity with which the user/registrant is affiliated. In some contact objects, legal entities may be distinguished from private persons by the presence or absence of contact:org being nested within the contact:postal Info field/parameter/tag (or existing anywhere else in the contact object). These examples are non-limiting. Any information used to identify a means of contact for a user/registrant may be included in the contact object for that user/registrant. As non-limiting examples, a contact object may include contact information including an administrative contact or a technical contact for the user/registrant.

The WHOIS protocol has no provisions for strong security. WHOIS lacks mechanisms for access control, integrity, and confidentiality. Accordingly, WHOIS-based services are used for information which is non-sensitive and intended to be accessible to everyone. This may be exploited by unscrupulous Internet users who may register domain names which infringe famous trademarks.

These users may copy the contact information from WHOIS information associated with a domain name/website which uses the legitimate trademark, then list the legitimate contact information as the contact information in WHOIS information for a domain name/website that infringes the legitimate famous trademark, thereby "spoofing" the legitimate trademark, domain name and/or website, As a non-limiting example, a website creator may create a bogus website, found at the URL http://www.goodaddy.com, using the "goodaddy.com" domain name to "spoof" a legitimate website such as http://www.godaddy.com. In other words, this individual or group may create a website for the purposes of convincing e-commerce customers that the goodaddy.com website is the legitimate website for GODADDY.COM goods and services.

Although the terms of service for registering a domain name may require valid data, unscrupulous Internet users may attempt to add further legitimacy to their bogus websites by copying contact information from a valid website into the WHOIS information and/or contact object, inserting that information into the WHOIS information and/or contact object for the domain name associated with the bogus website, then changing only a few of the parameters, such as an email address or a fax number. Consequently, the response received from a WHOIS information request may appear to be legitimate, but may in fact belong to the unscrupulous Internet users spoofing a legitimate website.

Currently, the contact information that a domain name registrant enters into WHOIS information is unsupervised and unregulated. This means that anyone can assign any domain name to a new or existing registrant contact without prior approval, permission or even knowledge of the contact. This also means that the contact may be unaware that they are responsible for online conduct associated with the domain name.

A similar problem exists with contact information associated with name servers. When registering a domain name, a user may be required to enter a primary and secondary name server used to resolve the domain name. Like WHOIS information, the information entered by a user for the primary or secondary name servers is unsupervised and unregulated. In this case, unscrupulous users may falsify the name server information, while other users may be unfamiliar with primary and secondary name servers, so may enter inaccurate information.

As a non-limiting example, a user may enter example.net as their primary name server, but may be unsure of the correct secondary name server, so may enter secondary.net simply to complete the registration process. Doing so may cause a website/server where the actual secondary.net domain name resolves to get overwhelmed by Internet traffic. It is therefore in all users' best interests to be sure that the information for the primary and secondary name servers are capable of being validated.

The sheer volume of websites, domain names and Internet traffic makes it impossible for domain name registrars to monitor and validate all WHOIS, contact objects and/or name servers in real time. Applicant has therefore determined that presently-existing systems and methods do not provide optimal means for monitoring, detecting and alerting a domain name owner if the WHOIS, contact object, name servers and/or other registrant information is inaccurate and if any websites related to the spoofed domain names is being exploited.

Figure 3:
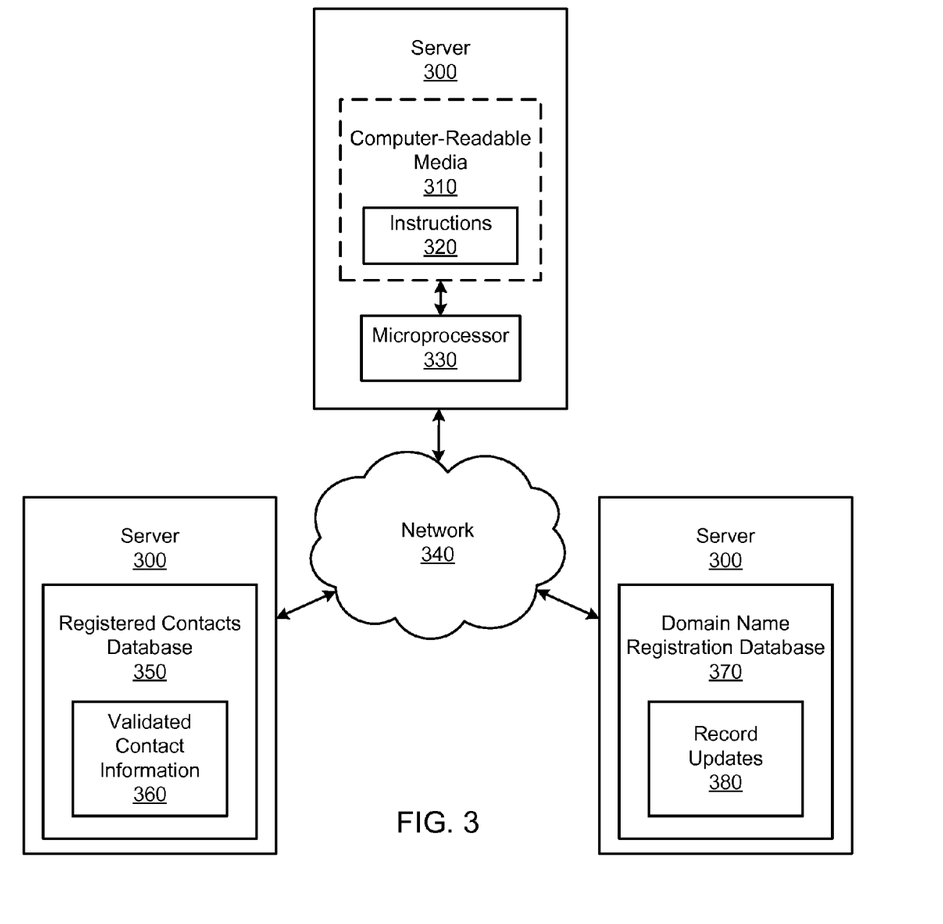
FIG. 3 illustrates a possible embodiment of a system for validating a user's control over contact information stored in a domain name registration database.
Figure 4:
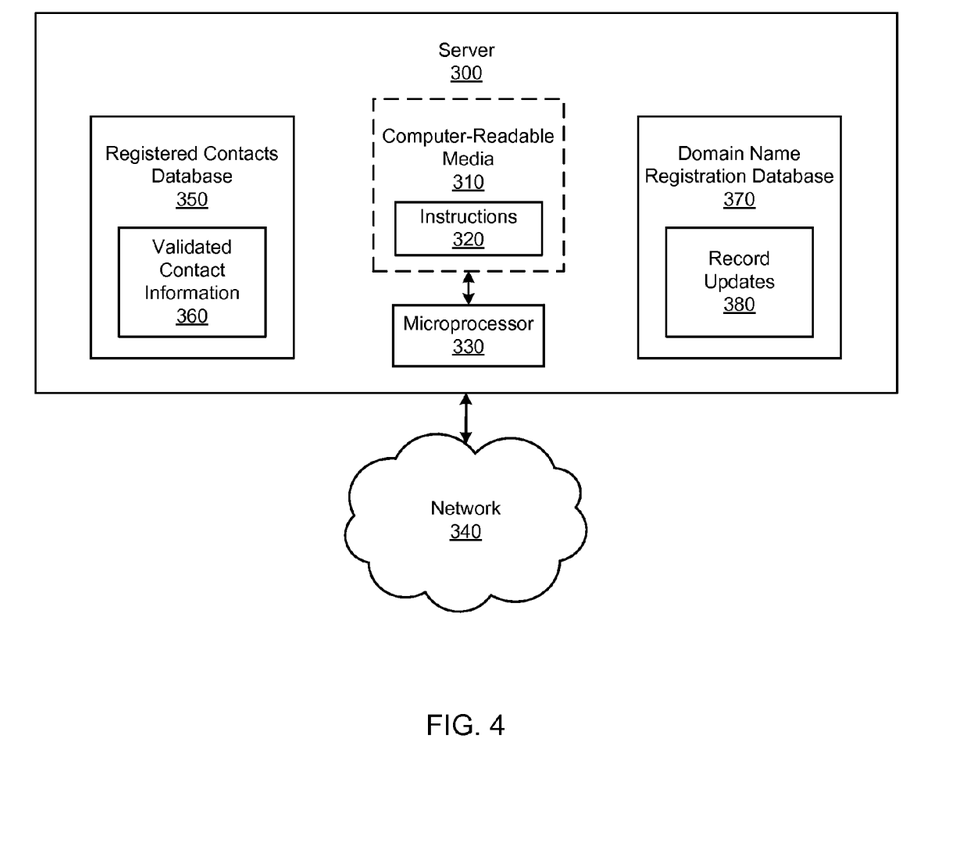
FIG. 4 illustrates a possible embodiment of a system for validating a user's control over contact information stored in a domain name registration database.

Numerous methods may be used with the systems described below. As a non-limiting example, the method illustrated in FIG. 1 (and all methods described herein) may be performed by (at least) any central processing unit (CPU) in one or more computing devices or systems, such as a microprocessor running on a server communicatively coupled to a network (e.g., the Internet) and executing instructions stored (perhaps as scripts and/or software) in computer-readable media accessible to the CPU, such as a hard disk drive or solid-state memory on a server. Example systems that may be used to perform the methods described herein are illustrated in FIGS. 3-4 and described in detail below.

Figure 1:
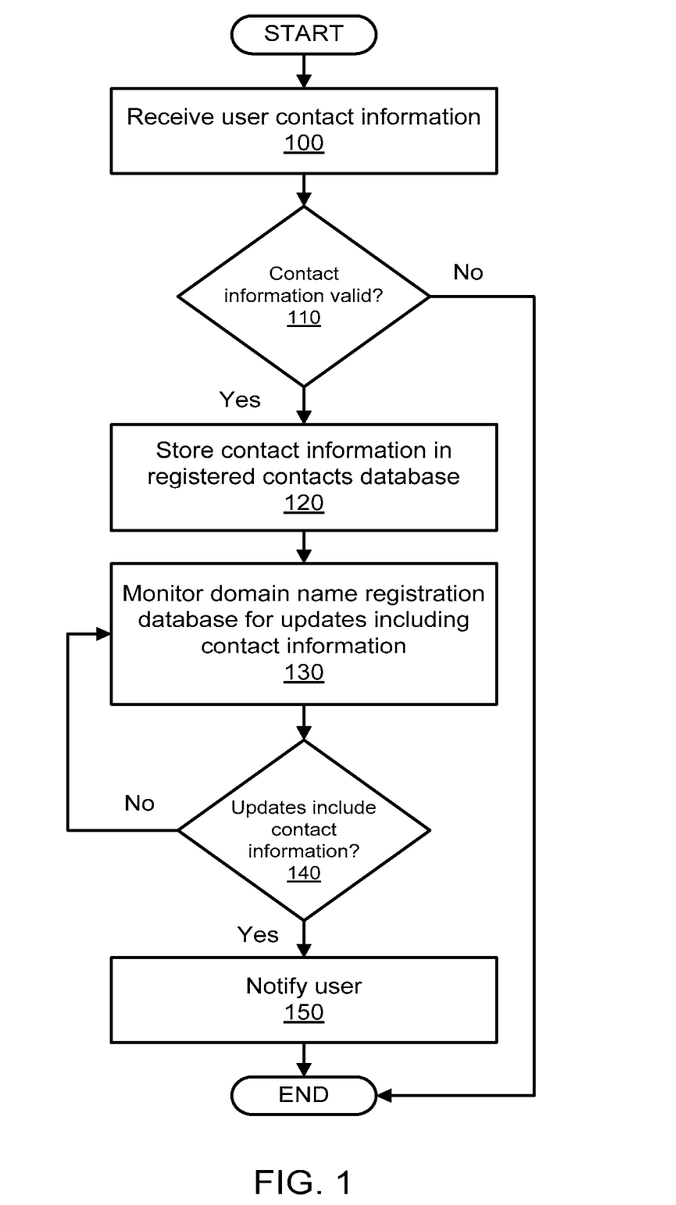
FIG. 1 is a flow diagram illustrating a possible embodiment of a method of validating a user's control over contact information stored in a domain name registration database.

FIG. 1 illustrates an embodiment of a method of validating a user's control over contact information that may comprise at least one server computer receiving contact information for a user (Step 100) and determining whether the contact information for the user is valid (Step 110). If the contact information for the user is determined to be valid (Step 110), the server(s) may store the contact information in a registered contacts database (Step 120), monitor a plurality of record updates in a domain name registration database for the contact information (Step 130) and determine whether the contact information appears in the record updates (Step 140). If the contact information is determined to appear in the record updates (Step 140), the server(s) may notify the user that the contact information appears in the record updates (Step 150). The server(s), registered contacts database and domain name registration database may all be communicatively coupled to a network.

As a non-limiting example, Steps 100-150 may be accomplished by at least one server computer, which may be configured to receive the user contact information (Step 100), determine if the contact information is valid (Step 110), store the contact information in a registered contacts database (Step 120), monitor a domain name registration database for updates which include the contact information (Step 130), determine whether the updates include the contact information (Step 140) and notify the user that the contact information appears in the record updates (Step 150). Alternatively, Steps 100-150 may be accomplished by any software, scripts, or code, perhaps running on the server(s).

As another non-limiting example, Step 120 may be accomplished by a registered contacts database running on at least one server by receiving and storing the contact information from a client computer or from one or more server computers.

In various embodiments, in addition to running the registered contacts database, the server(s) may also host a registrar website configured to register one or more domain names to one or more registrants. The domain name may be registered to the registrant by any means known in the art, including, but not limited to, searching for an available domain name using one or more control panels on a registrar website, selecting an available domain name and registering the domain name according to known domain name registration practices.

The server(s) may also host one or more control panels, the instructions for which may be transmitted to, and displayed, possibly via an Internet browser, on each of one or more client computers communicatively coupled to the network. Various combinations of these control panels may be utilized by the user/registrant to register a domain name, add contact information to the WHOIS information and/or contact object, purchase the "registered contacts" service as described herein and/or accomplish any other method steps disclosed herein.

One or more of the control panels displayed on the client(s) may receive contact information for a user/registrant. The contact information may include any of the contact object fields/parameters/tags disclosed herein. Specifically, the contact information may include any combination of a name, an address, a phone number, a fax number, an email address, an administrative contact, a technical contact, name server information and any other contact information for the user/registrant. The server(s) may then receive the contact information for the user/registrant (Step 100), possibly via an electronic transmission from the client.

In embodiments where the user/registrant has selected an option from the one or more control panels to purchase a registered contacts service and/or create a registered contact, the server(s) may determine whether the received contact information for the user is valid (Step 110). If the received contact information is not valid, the process may end.

The step of determining whether the contact information for the user is valid may be accomplished by determining whether the user/registrant has control over the contact information, and verifying the user/registrant's control over the contact information. This may be accomplished by various means according to one or more methods of contact.

The user/registrant may demonstrate control over the contact information by submitting documentation which verifies the identity of the individual or entity which registered the domain name, and which could not be produced by a registrant of a bogus domain name and/or website. As non-limiting examples, a legitimate user/registrant could submit documents such as a copy of: a business license, documentation verifying a registered trademark, phone records, fax transmission receipts, a title to or lease agreement for a property at a particular address, a driver's license, documentation demonstrating control of a primary and/or secondary name server, etc. In some embodiments, copies of this documentation may be uploaded as electronic documents or images via the one or more control panels.

As another non-limiting example, after receiving a request from the user/registrant for the registered contacts service, the server(s) may generate a code which requires a response from the registrant. This code may be delivered either physically or electronically (e.g. via the postal address, email address, telephone number, fax number etc. provided by the user/registrant and included in the provided contact information) and responded to by the user/registrant. In these embodiments, once the registrant has responded with the code, thereby verifying that they have control of the contact information, the contact information may be considered a registered contact.

The step of verifying the user/registrant's control over contact information may also be accomplished by determining whether the contact information matches a third party record for the user/registrant. As a non-limiting example, if a third party maintained records of the documentation disclosed above which verifies the identity of the individual or entity which registered the domain name (e.g. a hosting provider maintaining records that a particular name server is controlled by a particular individual/business entity), these records could be used to verify that a user/registrant has control over the contact information.

In various embodiments, if the registered domain name is the first domain name registered by the registrant, one of the control panels may be automatically displayed to offer the registered contacts service to the user/registrant. Such a control panel may also be displayed any time during or after a registrant has registered their first domain name.

Once the validity of the contact information for the user/registrant has been confirmed (Step 110), the server(s) may store the contact information (the "registered contact") in a registered contacts database (Step 120). The registered contact may be stored in association with a particular user/registrant. If one or more registered contacts already exist in the registered contacts database for the user/registrant, the registered contact to be added may be associated in the registered contacts database with similarly guarded identities, as long as the registered contact to be added has been verified. Put another way, the server(s) may compile the registered contacts for a user/registrant to generate an object containing all of the registered contacts for a user/registrant. This object may be analogous to a contact object and/or registrant contact object.

The server(s) may monitor updates to any of a plurality of records in a domain name registration database (Step 130). The domain name registration database may be, as a non-limiting example, a WHOIS database containing a plurality of WHOIS, contact object and/or other contact records. Each of the plurality of records, in turn, may contain WHOIS and/or other contact information for each of a plurality of domain name registrants.

The plurality of records may be monitored for updates which include the contact information stored in the registered contacts database (Step 130). In various embodiments, these record updates may include record updates caused by a domain name registration, a domain name transfer, a record modification or any other update capable of changing and/or taking advantage of the contact information in the domain name registration database.

The server(s) may determine whether the contact information is found in any of the updates made to the plurality of records in the domain name registration database (Step 140). In other words, if a domain name is registered, transferred or modified, and/or any other updates are made to the information in the plurality of records in the domain name registration database such as changes to domain name information, WHOIS information, name server information and/or one or more contact objects, the server(s) may determine if the information, such as contact information, matches any of the registered contacts associated with a user/registrant and stored in the registered contacts database (Step 140).

To make the determination of such a match, the server(s) may compare the registered contact for each user/registrant with the contact information being updated in the domain name registration database. If the server(s) find an exact match or a match with a high degree of similarity (e.g. only 1 registered contact not in common with the contact information), this would count as a "match" or a "hit."

If the server(s) determine that the records being updated in the domain names registration database include a match or a hit with the registered contact information for the user/registrant which created the registered contact, then this user/registrant may be notified of the update (Step 150). The notification received by the user/registrant may include information identifying the domain name that caused the match or hit. Using this and other information, the user/registrant may then become aware that another entity is trying to spoof their domain name and/or website (or other illegitimate online conduct), and can recognize and take action on any legal or other responsibility to, for example, report the unethical conduct.

Figure 2:
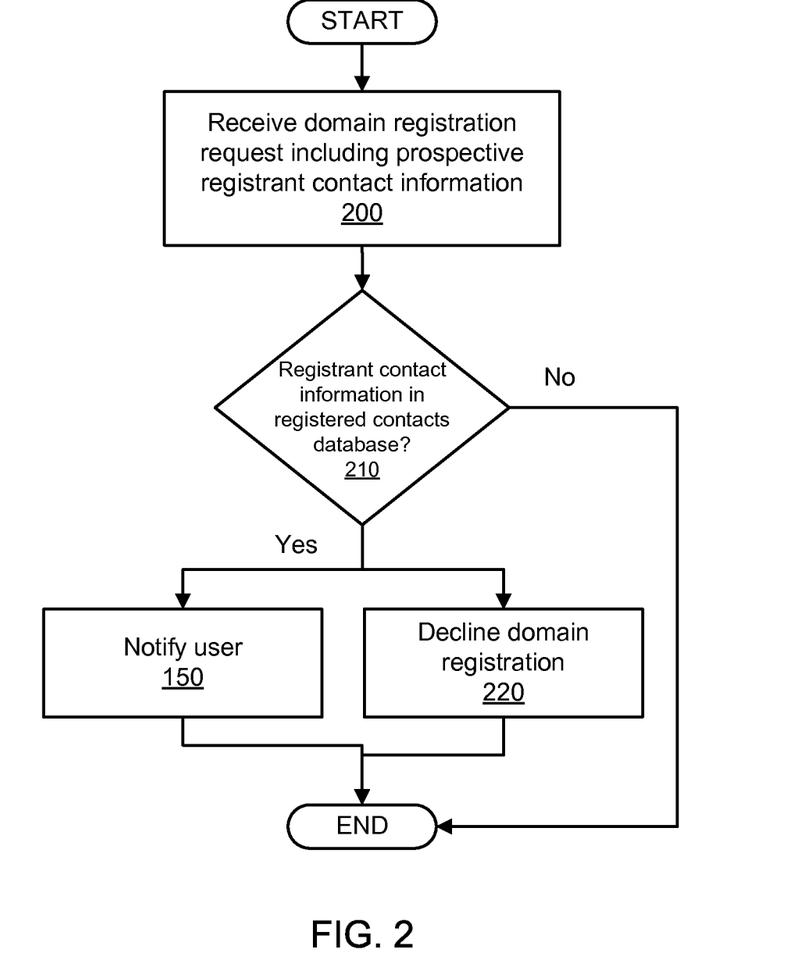
FIG. 2 is a flow diagram illustrating a possible embodiment of a method of validating a user's control over contact information stored in a domain name registration database.

FIG. 2 illustrates an embodiment of a method of validating a user's control over contact information that may comprise at least one server computer receiving a request to register a domain name to a prospective registrant (Step 200) and determining whether a prospective registrant contact information, included with the request, matches a contact information for a user stored in a registered contacts database and determined to be valid (Step 210). If the prospective registrant contact information is determined to match the contact information for the user stored in the registered contacts database, the server computer(s) may notify the user that the prospective registrant contact information matches the contact information for the user stored in the registered contacts database (Step 150) or decline to register the domain name to the prospective registrant (step 220). The server computer(s) and registered contacts database may be communicatively coupled to a network.

As a non-limiting example, Steps 200-220 (including step 150) may be accomplished by at least one server computer, which may be configured to receive a domain name registration request (Step 200), determine whether the contact information included in the domain registration request is in the registered contacts database (Step 210), notify the user that the registrant contact information is in the registered contacts database (Step 150) and/or decline domain name registration (Step 220) Alternatively, Steps 200-220 (including step 150) may be accomplished by any software, scripts, or code, perhaps running on the server.

As another non-limiting example, Step 210 may be accomplished by the registered contacts database running on the server by receiving a database query from the server and determining if the registered contact information is in the registered contacts database.

In various embodiments, the request to register the domain name to the prospective registrant, as well as contact information for the prospective registrant, may be received (Step 200) via the previously disclosed registrar website, possibly via one or more of the previously disclosed one or more control panels displayed on a client computer.

Upon receiving the request to register a domain name to a prospective registrant (Step 200), the server(s) may determine whether the received prospective registrant contact information matches contact information for a user/registrant stored in the registered contacts database (Step 210) and determined to be valid. In these example embodiments, the contact information stored in the registered contacts database has already been determined to be valid according to any steps of validating contacts in the registered database disclosed herein. A match or hit between the received prospective registrant contact information and the contact information for the user/registrant stored in the registered contact database may be determined according to any steps of determining a match or hit disclosed herein.

If the prospective registrant contact information is determined to match the contact information for the user/registrant stored in the registered contacts database (Step 210), the servers(s) may be configured to notify the user/registrant which originally entered the registered contact(s) of the request to register the domain name (Step 150) according to any steps of notifying the user/registrant of a match or hit disclosed herein. The notification may also include the domain name which caused the hit and may inform the user/registrant that the prospective registrant contact information matches the contact information for the user/registrant stored in the registered contacts database.

In an alternate embodiment, the server(s) and/or the registrar website may be configured to decline the domain name registration (Step 220) by cancelling the transaction which created the hit. In other words, if the prospective registrant contact information included in a domain name request matches contact information stored in the registered contacts database, the server and/or registrant website may be configured to cancel the transaction to register the domain name requested by the prospective registrant.

FIG. 3 illustrates an embodiment of a system for validating a user's control over contact information that may comprise one or more server(s) 300 communicatively coupled to a network 340 running a registered contacts database 350 and a domain name registration database 370.

The one or more servers 300 may be configured to receive contact information for a user (Step 100) and determine whether the contact information for the user is valid (Step 110). If the contact information for the user is determined to be valid (Step 110), the server computer(s) 300 may further store the validated contact information 360 in a registered contacts database 350 (Step 120), monitor a plurality of record updates 380 in a domain name registration database 370 for the contact information (Step 130) and determine whether the validated contact information 360 appears in the record updates 380 (Step 140). If the validated contact information 360 is determined to appear in the record updates 380 (Step 140), the server computer(s) 300 may notify the user that the validated contact information 360 appears in the record updates 380 (Step 150). The server(s) 300 may accomplish these method steps according to any of the detailed disclosures of the method steps herein.

The example embodiments illustrated herein place no limitation on network 340 configuration or connectivity. Thus, as non-limiting examples, the network 340 could comprise the Internet, the public switched telephone network, the global Telex network, computer networks (e.g., an intranet, an extranet, a local-area network, or a wide-area network), wired networks, wireless networks, or any combination thereof.

System components may be communicatively coupled to the network 340 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

Server(s) 300 (and/or any other server described herein) may comprise any computer or program that provides services to other computers, programs, or users either in the same computer or over a computer network 340. As non-limiting examples, the one of more servers 300 could be application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, or any combination thereof).

Server(s) 300 may comprise a computer-readable storage media 310 storing instructions 320 that, when executed by a microprocessor 330, cause the server 300 to perform the steps for which it is configured. Such computer-readable media 310 may comprise any data storage medium capable of storing instructions 320 for execution by a computing device. It may comprise, as non-limiting examples, magnetic, optical, semiconductor, paper, or any other data storage media, a database 350, 370 or other network storage device, hard disk drives, portable disks, CD-ROM, DVD, RAM, ROM, flash memory, and/or holographic data storage. The instructions 320 may, as non-limiting examples, comprise software and/or scripts stored in the computer-readable media 310 that may be stored locally in the server 300 or, alternatively, in a highly-distributed format in a plurality of computer-readable media 310 accessible via the network 340, perhaps via a grid or cloud-computing environment.

Such instructions 320 may be implemented in the form of software modules. Each module described herein may comprise a self-contained software component that may interact with the larger system and/or other modules. A module may comprise an individual (or plurality of) file(s) and may execute a specific task within a larger software and/or hardware system. As a non-limiting example, a module may comprise any software and/or scripts running on one or more servers 300 containing instructions 320 (perhaps stored in computer-readable media 310 accessible by the server computer's 300 computer processor 330) that, when executed by the computer processor 330, cause the server computer 300 to perform the steps for which it is configured.

The registered contacts database 350, the domain name registration database 370 and/or any other database described herein may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future. In some embodiments, the domain name registration database may comprise a WHOIS database.

FIG. 3 also illustrates an embodiment of a system for validating a user's control over contact information wherein the server(s) 300 may be configured to receive a request to register a domain name to a prospective registrant (Step 200) and determine whether a prospective registrant contact information, included with the request, matches a contact information 360 for a user stored in a registered contacts database 350 and determined to be valid (Step 210). If the prospective registrant contact information is determined to match the contact information 360 for the user stored in the registered contacts database 350 (Step 210), the server computer(s) 300 may notify the user that the prospective registrant contact information matches the contact information 360 for said user stored in said registered contacts database 350 (Step 150) or decline to register the domain name to the prospective registrant (Step 220). The server computer(s) 300 and registered contacts database 350 may all be communicatively coupled to the network 340. The server(s) 300 may accomplish these method steps according to any of the detailed disclosures of the method steps herein.

FIG. 4 illustrates an alternate, consolidated embodiment of a system for validating a user's control over contact information wherein a single server 300 comprises the computer readable media 310, instructions 320 microprocessor 330, registered contacts database 350 and domain name registration database 370. In a non-limiting example embodiment, the server(s) 300 may be a server or cluster of servers controlled by a domain name registrar. In such a consolidated environment the registrar may controls all elements of the system, including the disclosed registrar website (not shown) .Because of this, the registrar may have complete access to the domain names that it registers and any associated WHOIS data, thereby allowing the single registrar to compare the validated contact information 360 stored within the registered contacts database within its server(s) 300 with the record updates 380 stored in the domain name registration database 370 also within its own servers, thereby providing a simpler and more efficient environment.

In other embodiments, such as that illustrated in FIG. 3, the server(s) 300, registered contacts database 350 and domain name registration database 370 may exist in a highly distributed environment. In such an environment, a consortium of registrars may exist which share WHOIS and/or contact object information and domain name data so that all registration information such as contact information and subscription information may be cross checked against other registrars. In such an environment, a central repository of information may exist which each of the registrars may call into, thereby making all information available to all registrars within the consortium.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A method, comprising:
   A) receiving, by at least one server computer communicatively coupled to a network, a contact information for a user;
   B) determining, by said at least one server computer, whether said contact information for said user is valid;
   C) upon determination that said contact information for said user is valid then performing the steps of:
      i) storing, by said at least one server computer, said contact information in a registered contacts database;
      ii) monitoring, by said at least one server computer, a plurality of record updates in a domain name registration database for said contact information;
      iii) determining, by said at least one server computer, whether said contact information appears in said plurality of record updates; and
      iv) upon determination that said contact information appears in said plurality of record updates, then notifying, by said at least one server computer, said user that said contact information appears in said plurality of record updates; and
   D) upon determination that said contact information for said user is not valid then not performing the steps of:
      i) storing, by said at least one server computer, said contact information in said registered contacts database;
      ii) monitoring, by said at least one server computer, said plurality of record updates in said domain name registration database for said contact information;

iii) determining, by said at least one server computer, whether said contact information appears in said plurality of record updates; and
iv) upon determination that said contact information appears in said plurality of record updates, then notifying, by said at least one server computer, said user that said contact information appears in said plurality of record updates.

2. The method of claim 1, wherein said contact information comprises a name, an address, a phone number, a fax number, an email address, an administrative contact, or a technical contact for said user.

3. The method of claim 1, wherein said determining step B) is accomplished by determining whether said user has control over said contact information.

4. The method of claim 1, wherein said determining step B) is accomplished by determining whether said contact information matches a third party record for said user.

5. The method of claim 1, wherein said domain name registration database comprises a WHOIS database.

6. The method of claim 1, wherein said plurality of record updates comprise a record update caused by a new domain name registration, a domain name transfer, or a record modification.

7. A system, comprising: a server computer communicatively coupled to a network configured to:
A) receive a contact information for a user;
B) determine whether said contact information for said user is valid;
C) upon determination that said contact information for said user is valid then performing the steps of:
  i) store said contact information in a registered contacts database running on a server computer communicatively coupled to said network;
  ii) monitor, for said contact information, a plurality of record updates in a domain name registration database communicatively coupled to said network;
  iii) determine whether said contact information appears in said plurality of record updates; and
  iv) upon determination that said contact information appears in said plurality of record updates, then notify said user that said contact information appears in said plurality of record updates; and
D) upon determination that said contact information for said user is not valid then not performing the steps of:
  i) store said contact information in said registered contacts database running on said server computer communicatively coupled to said network;
  ii) monitor, for said contact information, said plurality of record updates in said domain name registration database communicatively coupled to said network;
  iii) determine whether said contact information appears in said plurality of record updates; and
  iv) upon determination that said contact information appears in said plurality of record updates, then notify said user that said contact information appears in said plurality of record updates.

8. The system of claim 7, wherein said contact information comprises a name, an address, a phone number, a fax number, an email address, an administrative contact, or a technical contact for said user.

9. The system of claim 7, wherein said server computer is configured to determine whether said contact information for said user is valid by determining whether said user has control over said contact information.

10. The system of claim 7, wherein said server computer is configured to determine whether said contact information for said user is valid by determining whether said contact information matches a third party record for said user.

11. The system of claim 7, wherein said domain name registration database comprises a WHOIS database.

12. The system of claim 7, wherein said plurality of record updates comprise a record update caused by a new domain name registration, a domain name transfer, or a record modification.

* * * * *